US006898284B2

(12) United States Patent
Solinas

(10) Patent No.: US 6,898,284 B2
(45) Date of Patent: May 24, 2005

(54) CRYPTOGRAPHIC IDENTIFICATION AND DIGITAL SIGNATURE METHOD USING EFFICIENT ELLIPTIC CURVE

(75) Inventor: Jerome Anthony Solinas, Westminster, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 855 days.

(21) Appl. No.: 09/928,266

(22) Filed: Aug. 9, 2001

(65) Prior Publication Data

US 2002/0021803 A1 Feb. 21, 2002

Related U.S. Application Data

(60) Provisional application No. 60/226,209, filed on Aug. 18, 2000.

(51) Int. Cl.[7] .............................. H04L 9/06; H04L 9/30
(52) U.S. Cl. .......................... 380/28; 380/30; 713/161; 713/171; 713/174
(58) Field of Search ............................. 235/451; 380/1, 380/28, 30, 231, 265, 285; 708/491, 492, 523, 620; 713/161, 171, 174, 189, 193, 194, 500

(56) References Cited

U.S. PATENT DOCUMENTS

| | | | |
|---|---|---|---|
| 4,200,770 A | 4/1980 | Hellman et al. | |
| 5,159,632 A | 10/1992 | Crandall | |
| 5,271,061 A | 12/1993 | Crandall | |
| 5,463,690 A | 10/1995 | Crandall | |
| 5,581,616 A | 12/1996 | Crandall | |
| 5,805,703 A | 9/1998 | Crandall | |
| 6,049,610 A | 4/2000 | Crandall | |

OTHER PUBLICATIONS

D. Johnson and A. Menezes, "The Elliptic Curve Digital Signature Algorithm (ECDSA)," University of Waterloo, Aug. 23, 1999, http://cacr.math.waterloo.ca.*

J. Solinas. "Generalized mersenne numbers". Technical Report CORR–39, University of Waterloo, Sep. 1999, also available at http://cacr.math.waterloo.ca.*
FIPS PUB 186–2, Jan. 27, 2000, Digital Signature Standard, U.S. Dept. of Commerce (NIST).
Victor S. Miller, "Use of Elliptic Curves in Cryptography", Advances in Cryptography–Crypto 85, LNCS 218, pp. 417–426, 1986.
Neil Kobutz, "A Course in Number Theory and Cryptography," QA 241.K672, 1987, pp. 150–179.
Peter L. Montgomery, "Modular Multiplication Without Trail Division," Mathematics of Computation, vol. 44, No. 170, Apr. 1985 pp. 519–521.

* cited by examiner

Primary Examiner—Andrew Caldwell
Assistant Examiner—Tamara Teslovich
(74) Attorney, Agent, or Firm—Robert D. Morelli

(57) ABSTRACT

A method of identifying user, generating digital signature, and verifying digital signature by selecting a modulus p in the form of $p=(2^{dk}-2^{ck}-1)/r$, $p=(2^{dk}-2^{(d-1)k}+2^{(d-2)k}- \ldots -2^k+1)/r$, $p=(2^{dk}-2^{ck}-1)/r$, $p=(2^{dk}-2^{ck}+1)/r$, and $p=(2^{4k}-2^{3k}+2^{2k}+1)/r$, selecting an elliptic curve E and an order q; selecting a basepoint G; generating a private key w; generating a public key W=wG; distributing p, E, q, G, and W to at least a prover, a verifier, and a signer; generating the prover's private key $w_p$ and public key $W_p=w_pG$; retrieving the prover's public key $W_p$; generating a private integer $k_p$; combining $k_p$ and G to form K using p; sending K to the verifier; sending a challenge integer c to the prover; combining c, $k_p$, and $w_p$ to form a response integer v; sending v to the verifier; combining cG, K, and $W_p$ using p and checking to see if the combination is equal to vG. If not so, stop. Otherwise, generating, by the signer, the signer's private key $w_s$; generating a private integer $k_s$; combining $k_s$ and G to form K using p; combining K and a message M to form an integer h; combining h, $k_s$, and $w_s$ to form an integer s; sending M and (K,s) as a digital signature of M; retrieving $W_p$; receiving M and (K,s); combining K and M to form an integer h; and combining h, K, and $W_p$ using p and checking to see if the combination is equal to sG. If so, the digital signature is verified.

5 Claims, 4 Drawing Sheets

CRYPTOGRAPHIC IDENTIFICATION AND DIGITAL SIGNATURE METHOD USING EFFICIENT ELLIPTIC CURVE

This application claims the benefit of U.S. Provisional Application No. 60/226,209, filed Aug. 18, 2000.

FIELD OF THE INVENTION

The present invention relates, in general, to cryptography and, in particular, to public key cryptography.

BACKGROUND OF THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification.

The use of cryptographic key pairs was disclosed in U.S. Pat. No. 4,200,770, entitled "CRYPTOGRAPHIC APPARATUS AND METHOD." U.S. Pat. No. 4,200,770 also disclosed the application of key pairs to the problem of key agreement over an insecure communication channel. The algorithms specified in this U.S. Pat. No. 4,200,770 rely for their security on the difficulty of the mathematical problem of finding a discrete logarithm. U.S. Pat. No. 4,200,770 is hereby incorporated by reference into the specification of the present invention.

In order to undermine the security of a discrete-logarithm based cryptoalgorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the cryptoalgorithm.

In particular, it is necessary that the numbers involved be large enough. The larger the numbers used, the more time and computing power is required to find the discrete logarithm and break the cryptography. On the other hand, very large numbers lead to very long public keys and transmissions of cryptographic data. The use of very large numbers also requires large amounts of time and computational power in order to perform the cryptoalgorithm. Thus, cryptographers are always looking for ways to minimize the size of the numbers involved, and the time and power required, in performing the authentication algorithms. The payoff for finding such a method is that cryptography can be done faster, cheaper, and in devices that do not have large amounts of computational power (e.g., hand-held smart-cards).

A discrete-logarithm based cryptoalgorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the cryptoalgorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

The groups which were envisioned in the above-named patents come from a setting called finite fields. A book by N. Koblitz, "A Course in Number Theory and Cryptography," (1987), and a paper by V. Miller, "Use of elliptic curves in cryptography," Advances in Cryptology—CRYPTO 85, LNCS 218, pp. 417–426, 1986, disclose the method of adapting discrete-logarithm based algorithms to the setting of elliptic curves. It appears that finding discrete logarithms in this kind of group is particularly difficult. Thus elliptic curve-based cryptoalgorithms can be implemented using much smaller numbers than in a finite-field setting of comparable cryptographic strength. Thus the use of elliptic curve cryptography is an improvement over finite-field based public-key cryptography.

There are several kinds of elliptic curve settings. These settings have comparable cryptographic strength and use numbers of comparable size. However, these settings differ in the amount of computation time required when implementing a cryptoalgorithm. Cryptographers seek the fastest kind of elliptic curve based cryptoalgorithms.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point O called the point at infinity. The infinity point is the additive identity (i.e., the infinity point plus any other point results in that other point). For cryptographic purposes, elliptic curves are typically chosen with F as the integers mod p for some large prime number p (i.e., Fp) or as the field of $2^m$ elements.

To carry out an elliptic curve-based key agreement procedure, it is necessary to perform a sequence of operations involving points on the curve and the equation of the curve. Each of these operations is carried out via arithmetic operations in the field F, namely addition, subtraction, multiplication, and division. If F is the set of integers mod p, then the simplest and most common way to carry out the arithmetic operations is to use ordinary integer arithmetic along with the process of reduction modulo p. This last process is called modular reduction.

Modular reduction is the most expensive part of the arithmetic operations in the field Fp. Therefore, the efficiency of an elliptic curve algorithm is enhanced when the cost of modular reduction is reduced. There are two common ways of doing this.

The first way is to avoid explicit modular reduction altogether by using an alternative method of carrying out the arithmetic operations in the field Fp. This was first proposed by P. Montgomery in the paper "Modular multiplication without trial division," Mathematics of Computation, 44 (1985), pp. 519–521. This method has the advantage that it can be applied to both elliptic and non-elliptic cryptoalgorithms.

The second way is to choose the prime modulus p in such a way that modular reduction is particularly easy and efficient. This approach yields faster elliptic curve algorithms than the first approach, but does not apply to non-elliptic cryptoalgorithms.

More specifically, suppose that one needs to reduce an integer b modulo p. Typically, b is a positive integer less than the square of the modulus p. In the general case, the best way to reduce b modulo p is to divide b by p; the result is a quotient and a remainder. The remainder is the desired quantity. The division step is the most expensive part of this process. Thus the prime modulus p is chosen to avoid the necessity of carrying out the division.

The simplest and best-known choice is to let p be one less than a power of two. Such primes are commonly called Mersenne primes. Because of the special form of a Mersenne prime p, it is possible to replace the division step of the modular reduction process by a single modular addition. A modular addition can be carried out using one or two integer additions, and so is much faster than an integer division. As a result, reduction modulo a Mersenne prime is much faster than in the general case.

A larger class of primes which contains the Mersenne primes as a special case is the class of pseudo-Mersenne primes. These include the Crandall primes and the Gallot primes. The Crandall primes are those of the form $2^m \pm C$, where C is an integer less than $2^{32}$ in absolute value. The Gallot primes are of the form $k*2^m \pm C$, where both k and C are relatively small.

U.S. Pat. No. 5,159,632, entitled "METHOD AND APPARATUS FOR PUBLIC KEY EXCHANGE IN A CRYPTOGRAPHIC SYSTEM"; U.S. Pat. No. 5,271,061, entitled "METHOD AND APPARATUS FOR PUBLIC KEY EXCHANGE IN A CRYPTOGRAPHIC SYSTEM"; U.S. Pat. No. 5,463,690, entitled "METHOD AND APPARATUS FOR PUBLIC KEY EXCHANGE IN A CRYPTOGRAPHIC SYSTEM"; U.S. Pat. No. 5,581,616, entitled "METHOD AND APPARATUS FOR DIGITAL SIGNATURE AUTHENTICATION"; U.S. Pat. No. 5,805,703, entitled "METHOD AND APPARATUS FOR DIGITAL SIGNATURE AUTHENTICATION"; and U.S. Pat. No. 6,049,610, entitled "METHOD AND APPARATUS FOR DIGITAL SIGNATURE AUTHENTICATION"; each disclose the use of a class of numbers in the form of $2^q - C$ which make modular reduction more efficient and therefore, make cryptographic methods such as key exchange and digital signatures more efficient. The present invention does not use a class of numbers in the form of $2^q - C$. U.S. Pat. Nos. 5,159,632; 5,271,061; 5,463,690; 5,581,616; 5,805,703; and 6,049,610 are hereby incorporated by reference into the specification of the present invention.

Federal Information Processing Standards Publication 186-2 (i.e., FIPS PUB 186-2) discloses a digital signature standard. In the appendix of FIPS PUB 186-2 are recommended elliptic curves for a 192-bit, a 224-bit, a 256-bit, a 384-bit, and a 521-bit digital signature. The elliptic curves disclosed in FIPS PUB 186-2 are different from the elliptic curves used in the present invention.

SUMMARY OF THE INVENTION

It is an object of the present invention to efficiently create a digital signature using a modulus p selected from the following families of equations:

$$p=(2^{dk}-2^{ck}-1)/r;$$

where $0<2c<=d$, where r does not equal to 1, and where $GCD(c,d)=1$, where GCD is a function that returns the greatest common denominator between the variables in parenthesis;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r does not equal to 1, and where $GCD(c,d)=1$; and $$p=(2^{4k}-2^{3k}+2^{2k}+1)/r.$$

The first step through sixth step are done by each user who wishes to have its message digitally signed. The first step is selecting a modulus p from the following family of equations:

$$p=(2^{dk}-2^{ck}-1)/r;$$

where $0<2c<=d$, where r does not equal to 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r does not equal to 1, and where $GCD(c,d)=1$; and $$p=(2^{4k}-2^{3k}+2^{2k}+1)/r.$$

The second step is selecting an elliptic curve E and an order q.

The third step is selecting a basepoint G.

The fourth step is generating a private key w.

The fifth step is generating a public key W=wG.

The sixth step is distributing p, E, q, G, and W in an authentic manner.

The seventh step through fifteenth step are done to identity the user who wishes to have a message digitally signed. The seventh step is a prover generating its private key $w_p$ and public key $W_p=w_pG$, and distributing its $W_p$.

The eighth step is a verifier retrieving the prover's public key $W_p$.

The ninth step is the prover generating a private integer $k_p$.

The tenth step is the prover combining $k_p$ and G to form K using the form of the modulus p.

The eleventh step is the prover sending K to the verifier.

The twelfth step is the verifier sending a challenge integer c to prover.

The thirteenth step is the prover combining c, $k_p$, and $w_p$ to form a response integer v.

The fourteenth step is the prover sending v to the verifier.

The fifteenth step is the verifier combining cG, K, and $W_p$ using the form of the modulus p and checking to see if the combination is equal to vG. If the combination is equal to vG then the prover is properly identified. Otherwise, the prover is not properly identified.

The sixteenth step through the twenty-first step are done by the person digitally signing a message. The sixteenth step is a signer generating its private key $w_s$.

The seventeenth step is the signer generating a private integer $k_s$.

The eighteenth step is the signer combining $k_s$ and G to form K using the form of the modulus p.

The nineteenth step is the signer combining K and a message M to form an integer h.

The twentieth step is the signer combining h, $k_s$, and $w_s$ to form an integer s.

The twenty-first step is the signer sending the message M and the digital signature (K,s) of M.

The twenty-second step through the twenty-fifth step are done by the person verifying the digital signature. The twenty-second step is the verifier retrieving the prover's public key $W_p$.

The twenty-third step is the verifier receiving M and (K,s).

The twenty-fourth step is the verifier combining K and M to form an integer h.

The twenty-fifth step is the verifier combining h, K, and $W_p$ using the form of the modulus p and checking to see if the combination is equal to sG. If so, then the digital signature is verified. Otherwise, the digital signature is not verified.

The twenty-sixth step through the thirty-first step are alternative steps for digitally signing a message. The twenty-sixth step is a signer retrieving its private key $w_s$.

The twenty-seventh step is the signer generating a private integer $k_s$.

The twenty-eighth step is the signer combining $k_s$ and G to form K using the form of the modulus p.

The twenty-ninth step is the signer combining K and a message M to form an integer h.

The thirtieth step is the signer combining h, $k_s$, and $w_s$ to form an integer s.

The thirty-first step through thirty-sixth steps are alternative steps for verifying the digital signature of the alternative signing steps. The thirty-first step is the signer sending the message M and the digital signature (h,s) of M.

The thirty-second step is the verifier retrieving the prover's public key $W_p$.

The thirty-third step is the verifier receiving M and (h,s).

The thirty-fourth step is the verifier combining h, $W_p$, and sG using the form of the modulus p to form K.

The thirty-fifth step is the verifier combining K and M to form an integer h'.

The thirty-sixth step is the verifier checking to see if h is equal to h'. If so, then the digital signature is verified. Otherwise, the digital signature is not verified.

DETAILED DESCRIPTION

The present invention is a method of identifying a user, generating a digital signature for a message of the user, and verifying the digital signature in an efficient manner (i.e., in fewer steps than the prior art) using a modulus p selected from the following family of equations:

$$p=(2^{dk}-2^{ck}-1)/r;$$

where $0<2c<=d$, where r does not equal to 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r does not equal to 1, and where $GCD(c,d)=1$; and $$p=(2^{4k}-2^{3k}+2^{2k}+1)/r.$$

It has long been known that certain integers are particularly well suited for modular reduction. The best known examples are the Mersenne numbers $p=2^k-1$. In this case, the integers (mod p) are represented as k-bit integers. When performing modular multiplication, one carries out an integer multiplication followed by a modular reduction. One thus has the problem of reducing modulo p a 2k-bit number. Modular reduction is usually done by integer division, but this is unnecessary in the Mersenne case. Let $n<p^2$ be the integer to be reduced (mod p). Let T be the integer represented by the k most significant bits of n, and U the k least significant bits; thus $$n=2^kT+U,$$

with T and U each being k-bit integers. Then $$n=T+U(\text{mod } p).$$

Thus, the integer division by m can be replaced by an addition (mod p), which is much faster.

The main limitation on this scheme is the special multiplicative structure of Mersenne numbers. The above technique is useful only when one intends to perform modular arithmetic with a fixed long-term modulus. For most applications of this kind, the modulus needs to have a specific multiplicative structure, most commonly a prime number. The above scheme proves most useful when k is a multiple of the word size of the machine. Since this word size is typically a power of 2, one must choose k which is highly composite. Unfortunately, the Mersenne numbers arising from such k are never prime numbers. It is, therefore, of interest to find other families of numbers that contain prime numbers or almost prime numbers.

One such family is $2^k-c$, for c positive, which is disclosed in U.S. Pat. Nos. 5,159,632; 5,271,061; 5,463,690; 5,581,616; 5,805,703; and 6,049,610 listed above. The present invention discloses the use of other families of numbers.

Figure 1:
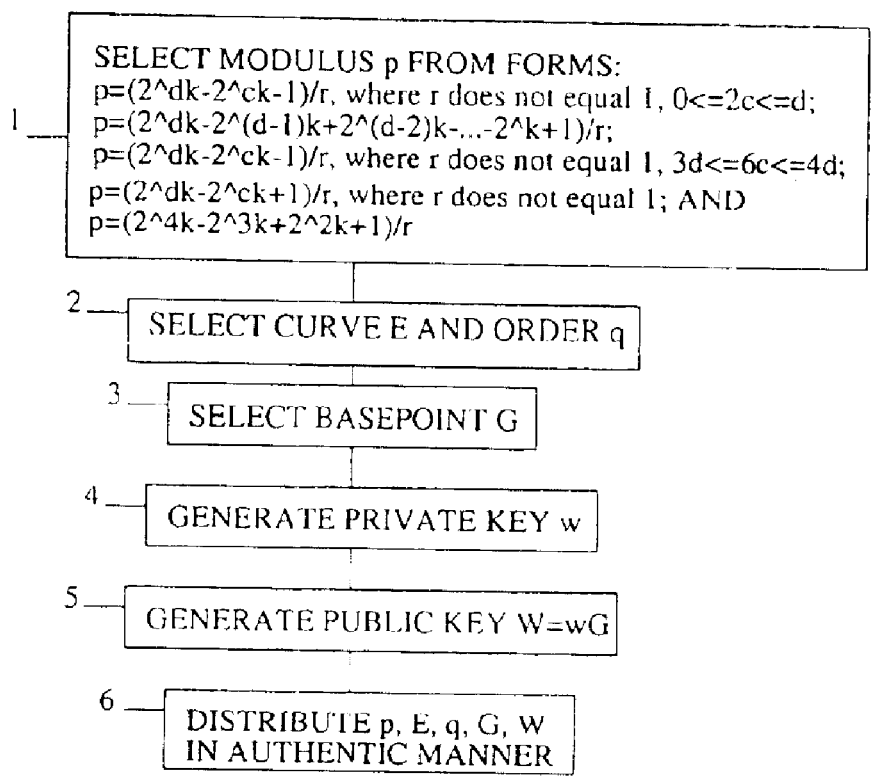
FIG. 1 is a list of steps that must be done by each user.

FIG. 1 is a list of steps that must be done by each user of the present invention.

The first step 1 of the present method is selecting a modulus p from the following family of equations:

$$p=(2^{dk}-2^{ck}-1)/r,$$

where $0<2c<=d$, where r does not equal to 1, and where $GCD(c,d)=1$;

$$p=(2^{dk}-2^{(d-1)k}+2^{(d-2)k}-\ldots-2^k+1)/r,$$

where d is even, and where k is not equal to 2 (mod 4);

$$p=(2^{dk}-2^{ck}-1)/r,$$

where $3d<6c<4d$, and where $GCD(c,d)=1$;

$$p=(2^{dk}-2^{ck}+1)/r,$$

where $0<2c<=d$, where r does not equal to 1, and where $GCD(c,d)=1$; and $$p=(2^{4k}-2^{3k}+2^{2k}+1)/r.$$

The second step 2 of the present method is selecting an elliptic curve E and an order q.

The third step 3 of the present method is selecting a basepoint G.

The fourth step 4 of the present method is generating a private key w.

The fifth step 5 of the present method is generating a public key W=wG.

The sixth step 6 of the present method is distributing p, E, q, G, and W in an authentic manner (e.g., courier, secure channel, etc.).

Figure 2:
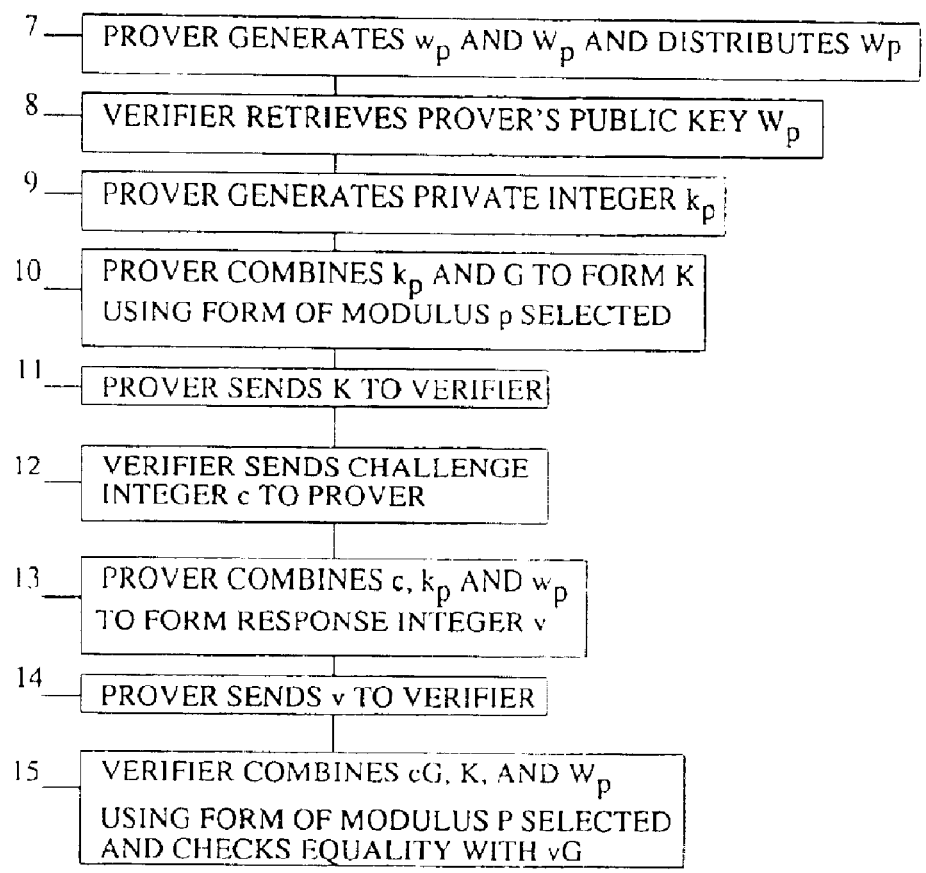
FIG. 2 is a list of steps for identifying a user.

FIG. 2 lists the steps for identifying a user.

The seventh step 7 of the method is a prover generating its private key $w_p$ and public key $W_p=w_pG$ and distributing $W_p$.

The eighth step 8 of the present method is a verifier retrieving the prover's public key $W_p$.

The ninth step 9 of the present method is the prover generating a private integer $k_p$.

The tenth step 10 of the present method is the prover combining $k_p$ and prover's G to form K using the form of the modulus p.

The eleventh step 11 of the present method is the prover sending K to the verifier.

The twelfth step 12 of the present method is the verifier sending a challenge integer c to the prover.

The thirteenth step 13 of the present method is the prover combining c, $k_p$, and $w_p$ to form a response integer v.

The fourteenth step 14 of the present method is the prover sending v to the verifier.

The fifteenth step 15 of the present method is the verifier combining cG, K, and $W_p$ using the form of the modulus p and checking to see if the combination is equal to vG. If the combination is equal to vG then the prover is properly identified. Otherwise, the prover is not properly identified.

Figure 3:
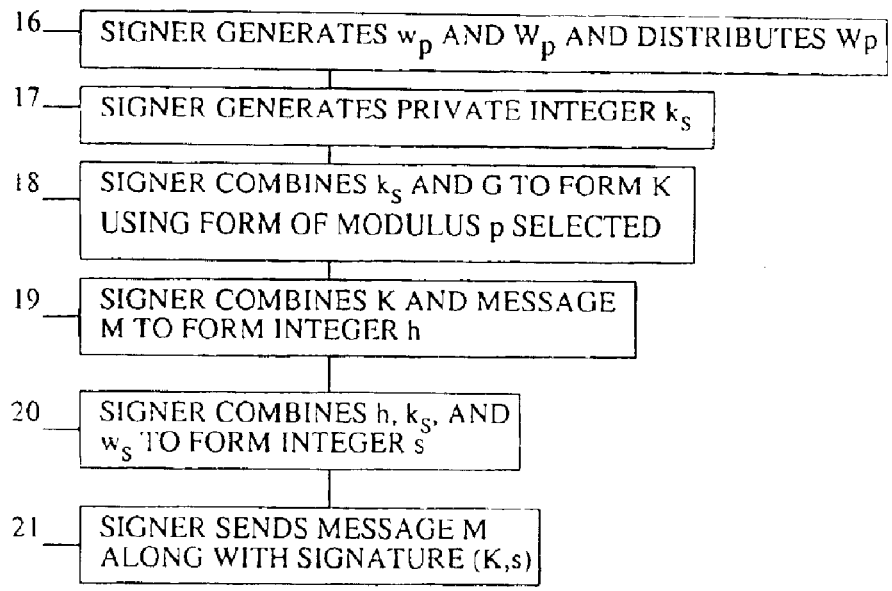
FIG. 3 is a list of steps for signing a digital signature.

FIG. 3 is a list of steps for signing a digital signature.

The sixteenth step 16 of the present method is a signer retrieving its private key $w_s$.

The seventeenth step 17 of the present method is the signer generating a private integer $k_s$.

The eighteenth step 18 of the present method is the signer combining $k_s$ and G to form K using the form of the modulus p.

The nineteenth step 19 of the present method is the signer combining K and a message M to form an integer h.

The twentieth step 20 of the present method is the signer combining h, $k_s$, and $w_s$ to form an integer s.

The twenty-first step 21 of the present method is the signer sending the message M and the digital signature (K,s) of M.

Figure 4:
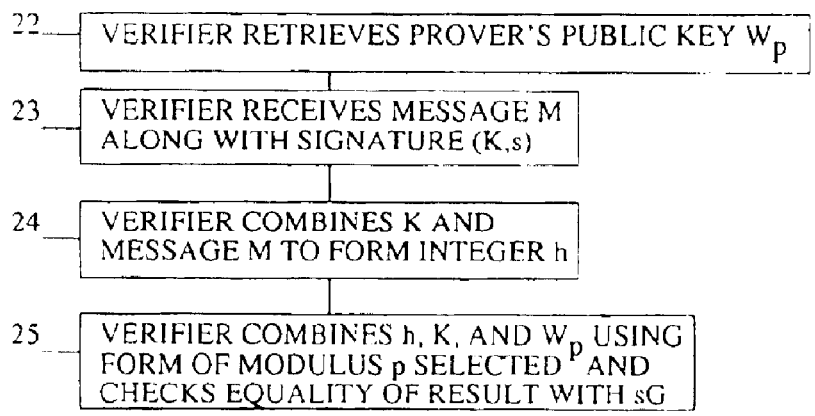
FIG. 4 is a list of steps for verifying a digital signature of FIG. 3.

FIG. 4 is a list of steps for verifying the digital signature generated by the steps of FIG. 3.

The twenty-second step 22 of the present method is the verifier retrieving the prover's public key $W_p$.

The twenty-third step 23 of the present method is the verifier receiving M and (K,s).

The twenty-fourth step 24 of the present method is the verifier combining K and M to form an integer h.

The twenty-fifth step 25 of the present method is the verifier combining h, K, and $W_p$ using the form of the modulus p and checking to see if the combination is equal to sG. If so, then the digital signature is verified. Otherwise, the digital signature is not verified.

Figure 5:
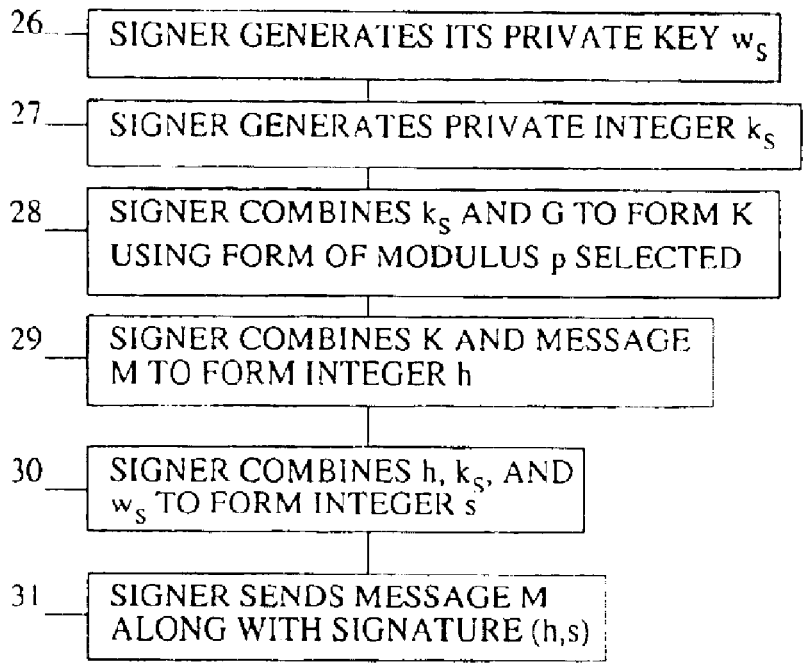
FIG. 5 is a list of alternate steps for signing a digital signature.

FIG. 5 is a list of alternate steps for signing a digital signature.

The twenty-sixth step 26 of the present method is a signer retrieving its private key $w_s$.

The twenty-seventh step 27 of the present method is the signer generating a private integer $k_s$.

The twenty-eighth step 28 of the present method is the signer combining $k_s$ and G to form K using the form of the modulus p.

The twenty-ninth step 29 of the present method is the signer combining K and a message M to form an integer h.

The thirtieth step 30 of the present method is the signer combining h, $k_s$, and $w_s$ to form an integer s.

The thirty-first step 31 of the present method is the signer sending the message M and the digital signature (h,s) of M.

Figure 6:
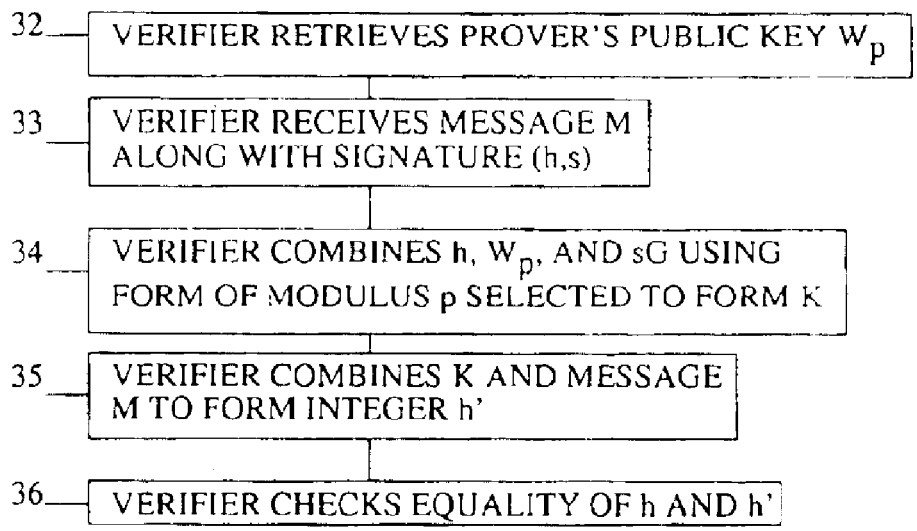
FIG. 6 is a list of alternate steps for verifying a digital signature of FIG. 5.

FIG. 6 is a list of alternate steps for verifying the digital signature generated by the steps of FIG. 5.

The thirty-second step 32 of the present method is the verifier retrieving the prover's public key $W_p$.

The thirty-third step 33 of the present method is the verifier receiving M and (h,s).

The thirty-fourth step 34 of the present method is the verifier combining h, $W_p$, and sG using the form of the modulus p to form K.

The thirty-fifth step 35 of the present method is the verifier combining K and M to form an integer h'.

The thirty-sixth step 36 of the present method is the verifier checking to see if h is equal to h'. If so, then the digital signature is verified. Otherwise, the digital signature is not verified.

What is claimed is:

1. A method of identifying a user, comprising the steps of:
   a) selecting, by the user, a modulus p from the group of equations consisting of:

$$p=(2^{dk}-2^{ck}-1)/r,$$

where $0<2c<=d$, where r does not equal to 1, and where GCD(c,d)=1;

$$p=(2^{dk}-2^{(d-1)k}+2^{(d-2)k}-\ldots-2^k+1)/r,$$

where d is even, and where k is not equal to 2 (mod 4);

$$p=(2^{dk}-2^{ck}-1)/r,$$

where $3d<6c<4d$, and where GCD(c,d)=1;

$$p=(2^{dk}-2^{ck}+1)/r,$$

where $0<2c<=d$, where r does not equal to 1, and where GCD(c,d)=1; and $$p=(2^{4k}-2^{3k}+2^{2k}+1)/r;$$

b) selecting, by the user, an elliptic curve E and an order q;
c) selecting, by the user, a basepoint G;
d) generating, by the user, a private key w;
e) generating, by the user, a public key W=wG;
f) distributing, by the user, p, E, q, G, and W in an authentic manner;
g) generating, by a prover, the prover's private key $w_p$ and public key $W_p$ and distributing $W_p$;
h) retrieving, by a verifier, the prover's public key $W_p$;
i) generating, by the prover, a private integer $k_p$;
j) combining, by the prover, $k_p$ and G to form K using the form of the modulus p;
k) sending, by the prover, K to the verifier;
l) sending, by the verifier, a challenge integer c to prover;
m) combining, by the prover, c, $k_p$, and $w_p$ to form a response integer v;
n) sending, by the prover, v to the verifier; and
o) combining, by the verifier, cG, K, and $W_p$ using the form of the modulus p and checking to see if the combination is equal to vG, if so the user is identified as the user, otherwise the user is not identified as the user.

2. The method of claim 1, further comprising the steps of:
a) generating, by a signer, the signer's private key $w_s$;
b) generating, by the signer, a private integer $k_s$;
c) combining, by the signer, $k_s$ and G to form K using the form of the modulus p;
d) combining, by the signer, K and a message M to form an integer h;
e) combining by the signer, h, $k_s$, and $w_s$ to form an integer s; and
f) sending, by the signer, M and (K,s) as a digital signature of M.

3. The method of claim 2, further including the steps of:
a) retrieving, by the verifier, the prover's public key $W_p$;
b) receiving, by the verifier, M and (K,s);
c) combining, by the verifier, K and M to form an integer h; and
d) combining, by the verifier, h, K, and $W_p$ using the form of the modulus p and checking to see if the combination is equal to sG, if so then the digital signature is verified, otherwise the digital signature is not verified.

4. The method of claim 1, further comprising the steps of:
a) generating, by a signer, the signer's private key $w_s$;
b) generating, by the signer, a private integer $k_s$;
c) combining, by the signer, $k_s$ and G to form K using the form of the modulus p;
d) combining, by the signer, K and a message M to form an integer h;
e) combining by the signer, h, $k_s$, and $w_s$ to form an integer s; and
f) sending, by the signer, M and (h,s) as a digital signature of M.

5. The method of claim 4, further including the steps of:
a) retrieving, by the verifier, the prover's public key $W_p$;
b) receiving, by the verifier, M and (h,s);
c) combining, by the verifier, h, $W_p$, and sG using the form of the modulus p to form K;
d) combining, by the verifier, K and M to form an integer h'; and
e) checking, by the verifier, that h is equal to h', if so then the digital signature is verified, otherwise the digital signature is not verified.

* * * * *